US012755192B2

(12) United States Patent
Stefani

(10) Patent No.: US 12,755,192 B2
(45) Date of Patent: Oct. 6, 2026

(54) QUERYING DATABASES WITH MACHINE LEARNING MODEL REFERENCES

(71) Applicant: Amazon Technologies, Inc., Seattle, WA (US)

(72) Inventor: Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1000 days.

(21) Appl. No.: 18/054,837

(22) Filed: Nov. 11, 2022

(65) Prior Publication Data

US 2023/0196199 A1 Jun. 22, 2023

Related U.S. Application Data

(63) Continuation of application No. 15/955,553, filed on Apr. 17, 2018, now Pat. No. 11,501,202.

(51) Int. Cl.

*G06N 20/00* (2019.01)
*G06F 16/903* (2019.01)
*G06N 5/022* (2023.01)

(52) U.S. Cl.

CPC ....... *G06N 20/00* (2019.01); *G06F 16/90335* (2019.01); *G06N 5/022* (2013.01)

(58) Field of Classification Search

None

See application file for complete search history.

(56) References Cited

U.S. PATENT DOCUMENTS 6,636,845 B2 10/2003 Chau et al.
7,340,448 B2 3/2008 Santosuosso
8,447,743 B2 5/2013 Santosuosso
11,501,202 B1 11/2022 Stefani
11,636,124 B1 * 4/2023 Narayanaswamy ........................ G06F 18/2148 707/776
2014/0372349 A1 12/2014 Driscoll
2015/0379424 A1 12/2015 Dirac
2018/0157978 A1 6/2018 Buda
2018/0336198 A1 11/2018 Zhong
2018/0357565 A1 12/2018 Syed
2019/0179940 A1 6/2019 Ross
2019/0279114 A1 9/2019 Deshpande
2024/0004932 A1 * 1/2024 BenHarush ....... G06F 16/90328

* cited by examiner

*Primary Examiner* — David R Vincent

(74) *Attorney, Agent, or Firm* — S. Scott Foster; Kowert, Hood, Munyon, Rankin & Goetzel, P.C.

(57) ABSTRACT

Querying databases may be performed with references to machine learning models. A database query may be received that references a machine learning model and database. In response to the query, the machine learning model may provide information which may be returned as part of a result of the query or may be used to generate a result of the query. The machine learning model may be generated in response to a request to generate a machine learning model that includes a database query that identifies the data upon which a machine learning technique may be applied to generate the machine learning model.

20 Claims, 11 Drawing Sheets

QUERYING DATABASES WITH MACHINE LEARNING MODEL REFERENCES

This application is a continuation of U.S. patent application Ser. No. 15/955,553, filed Apr. 17, 2018, which is hereby incorporated by reference herein in its entirety.

BACKGROUND

Machine learning techniques have contributed to great expansions in the capabilities of various applications to reason over and interact with data, other systems, and users. Many different types of machine learning models have been developed which may offer different benefits or advantages to those systems and/or developers capable of leveraging insights obtained from the machine learning models. Because machine learning techniques can require highly specialized skill sets to understand and architect solutions that rely upon or interact with machine learning models, techniques that make machine learning models more accessible to a diverse array of systems or developers who do not necessarily specialize in the deployment or training of machine learning models may be highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Figure 1:
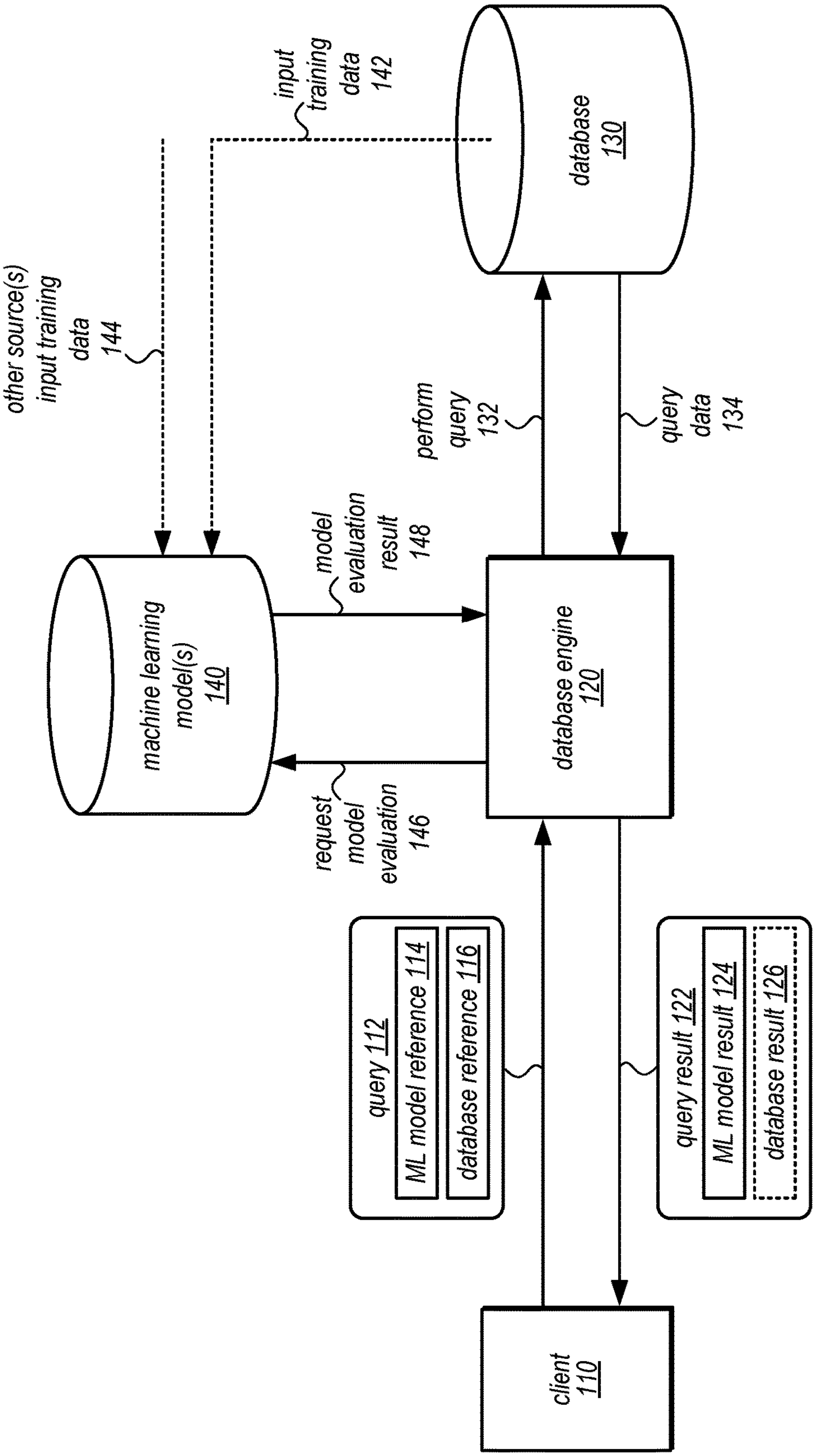
FIG. 1 is a logical block diagram illustrating querying databases with machine learning model references, according to some embodiments.

In various embodiments, querying databases with machine learning model references may be implemented. FIG. 1 is a logical block diagram illustrating querying databases with machine learning model references, according to some embodiments. A client 110 of a database engine 120 that provides access to a database 130 may submit queries, such as query 112 that include references to both a machine learning model, ML model reference 114, and database, database reference 116, in some embodiments. Database engine 120 may be able to recognize ML model reference 114 including determining where the referenced machine learning model is hosted, how to cause an evaluation of the model, and how results of the referenced machine learning model can be incorporated in a query result, such as query result 122, provided to client 110, in some embodiments.

Database engine 120 may be implemented as a single or distributed database engine (e.g., a cluster of database engine nodes that work together under the leadership of a coordinator or leader node or a cluster of database engines that work together without any coordinator or leader node), in some embodiments. Database engine 120 may be an engine that provides access to different types of data stored in various formats and/or offering various query or other access functionalities. For example database engine 120 may provide access to a relational database, implementing various features such as transactions and/or providing various performance guarantees or properties, such as Atomicity Consistency Isolation and Durability (ACID) properties. In some embodiments, database engine 120 may provide access to a non-relational database (e.g., NoSQL, document, graph, or other types of database systems). In some embodiments, database engine 120 may support data stored in row-oriented format, where database 130 stores an entire row or record together in common locations (e.g., data pages or blocks), whereas in other embodiments, database engine 120 may provide access to data store in column-oriented format, where database 130 stores values from one column across multiple rows or records of a database table in common locations (e.g., data pages or blocks). In at least some embodiments, database engine 120 may implement various features of an Online Transaction Processing (OLTP) database engine (e.g., to prioritize performance of data entry and retrieval queries). In some embodiments, database engine 120 may implement various features of an Online Analytical Processing (OLAP) database engine, such as may be found in a data warehouse (e.g., to optimize performance of complex or analytical queries).

In addition to the various types of databases supported by database 120, as discussed above, database 130 may be stored in various types, formats, or locations of storage, in some embodiments. For example, a separate storage system or service that provides network accessible storage may be implemented, in some embodiments, to store database 130 (similar to data storage service 220 discussed below with regard to FIGS. 2, 3, 4, and 6). In some embodiments, database 130 may be stored in local or directly attached storage to a system or host implementing database engine 120 (e.g., on one or more storage devices connected over a small computer systems interface (SCSI) type of connection, such as Fibre Channel, Universal Serial Bus (USB), Serial Attached SCSI (SAS), or other bus/interconnect interfaces).

Machine learning model(s) 140 may be generated from various different machine learning techniques or algorithms including, but not limited to, neural network-based learning methods, k-means clustering, principal component analysis, linear regression, linear classification, or factorization machines, among others. Machine learning model(s) 140 may be generated by separate hardware, hosts, or other resources different from those hosting or implementing database engine 120, in some embodiments, while in other embodiments, the same system or host(s) of database engine 120 may implement the training/model generation techniques to generate machine learning model(s) 140. Similar to database 130, machine learning model(s) 140 may be stored in separate storage systems or hosts (e.g., separate from database engine 120 or from engines and/or resources used to generate the model(s) 140), or locally with a database engine 120 and/or database 130, in some embodiments. In at least some embodiments, machine learning model(s) may be generated from input training data 142 obtained from database 130 (as discussed below with regard to FIGS. 7 and 10). In some embodiments, machine learning model(s) 140 may alternatively (or in combination with input training data 142) utilize other input training data sources 144 (e.g., other database, log files, data objects, etc.).

Client 110 may be a client application or process that establishes or utilizes a connection with database engine 120 to access database 130, in some embodiments. For example, client 110 may be a system that implements an Open Database Connectivity (ODBC) and/or Java Database Connectivity (JDBC) driver interface to send queries, such as query 112, to database engine 120, in some embodiments. Queries may be formatted according to various query protocols or languages, such as Structured Query Language (SQL), or programmatic interfaces (e.g., Application Programming Interfaces (APIs), in some embodiments. As illustrated in FIG. 1, a query 112 may include a machine learning model reference 114 (referencing machine learning model(s) 140), in some embodiments. The reference may be included as a key word, predicate value, parameter, or other criteria within query 112. The ML model reference 114 may indicate the desired evaluation or result to be obtained from an evaluation of machine learning model(s) 140 (e.g., an inference for a data value to be included in a query result). Query 112 may also include a database reference 116 which may identify database 130 as a source of data to provide a result 122 to the query, in some embodiments (e.g., such as a SQL statement "FROM table A").

Figure 8:
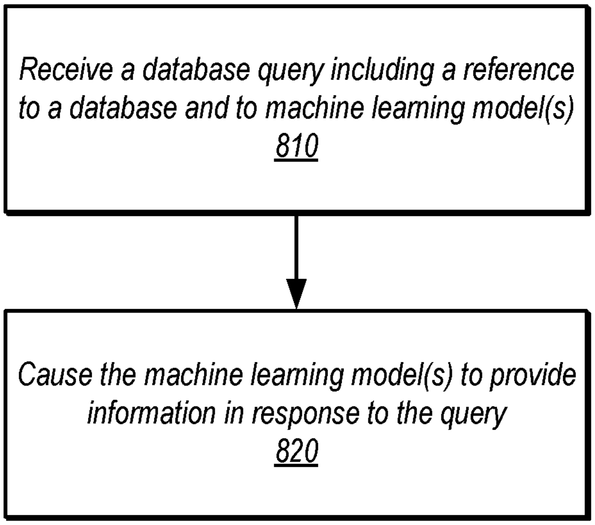
FIG. 8 is high-level flowchart illustrating various methods and techniques to implement querying databases with machine learning model references, according to some embodiments.

Database engine 120 may receive query 112 and recognize the ML model reference 114, as discussed below with regard to FIGS. 8 and 9. In some embodiments, database engine 120 may generate a query plan that includes operations instructing the performance and/or integration of machine learning model 140 evaluations with results or data obtained from database 130 (e.g., inferring data to add as if it were present in a row or record from a database table or to determine a predicate value for performing query operations, such as join predicate, filter predicate, aggregation value, etc.). Database engine 120 may send a request 146 or otherwise cause an evaluation of machine learning model(s) 140 according to the reference (e.g., by requesting an inferred value indicated in the reference). The request may be sent to a system, component, or resource on the same or different host than database engine 120 which can perform the specified evaluation of the machine learning model(s) 140, in some embodiments. A model evaluation result, such as an inferred value, may be returned, as indicated at 148. In some embodiments, database engine may also perform the query 132 with respect to database 130 (e.g., reading and evaluating records) in order to obtain query data 134 from database 130. In some embodiments, the obtained data may be input to the machine learning model evaluation, combined with, or provided irrespective of the model evaluation result 148. Database engine 120 may generate and return a query result 122 which may include information, such as ML model result 124, to a client (which may also include data obtained as a database result 126 from database 130), in some embodiments.

Querying databases with machine learning references may reduce the complexity of applications that utilize a machine learning model, in various embodiments. Instead of implementing an application that would have to separately manage database and machine learning information, including the combination or integration of information obtained from both systems, a single query may be able to invoke the desired functionality (reducing client resource investments, complexity of applications, simplifying interactions and behaviors, and/or allow an application the capability to take advantage of machine learning model insights that would otherwise not be available to the client application, among other benefits which may significantly increase the performance of client applications), in some embodiments. A database query interface may be widely supported (as opposed to applications that can integrate with machine learning models) and may lower the entry barrier for leveraging machine learning without needing deep machine learning expertise, in some embodiments. For example, database system developers could train models and run inferences against them via SQL queries, using an environment and language they are familiar with, in some embodiments. Moreover, database engines and/or resources that store, generate, and evaluate machine learning model may be tightly integrated with hardware that achieves maximum performance, freeing an application to be optimized for application specific functions (as opposed to integration functions to combine database information and machine learning insights). Separately hosted machine learning and database engines may also allow for integrating machine learning into database workloads with directly interfering with other database work, in some embodiments.

Please note, FIG. 1 is provided as a logical illustration of clients, database engines, databases, machine learning models, and respective interactions and is not intended to be limiting as to the physical arrangement, size, or number of components, modules, or devices to implement such features.

The specification first describes an example database service that utilizes a machine learning service in order to implement querying databases with machine learning model references. Included in the description of the example network-based database service are various aspects of the example network-based database service, such as a database engine hosts, a separate storage service, including storage hosts, as well as interactions with a machine learning service The specification then describes flowcharts of various embodiments of methods for implementing querying databases with machine learning model references. Next, the specification describes an example system that may implement the disclosed techniques. Various examples are provided throughout the specification.

The systems described herein may, in some embodiments, implement a network-based service that enables clients (e.g., subscribers) to operate a data storage or other database system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process. Note that requests sent from the database tier and the storage system may be asynchronous and that multiple such requests may be in flight at a time.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes. However, in other embodiments, both storage and database engines may be implemented together (not illustrated).

In various embodiments, the database systems described herein may support a standard or custom application programming interface (API) for a variety of database operations. For example, the API may support operations for creating a database, creating a table, altering a table, creating a user, dropping a user, querying a database (including a reference to a machine learning model), cancelling or aborting a query, creating or training a machine learning model, and/or other operations.

Figure 2:
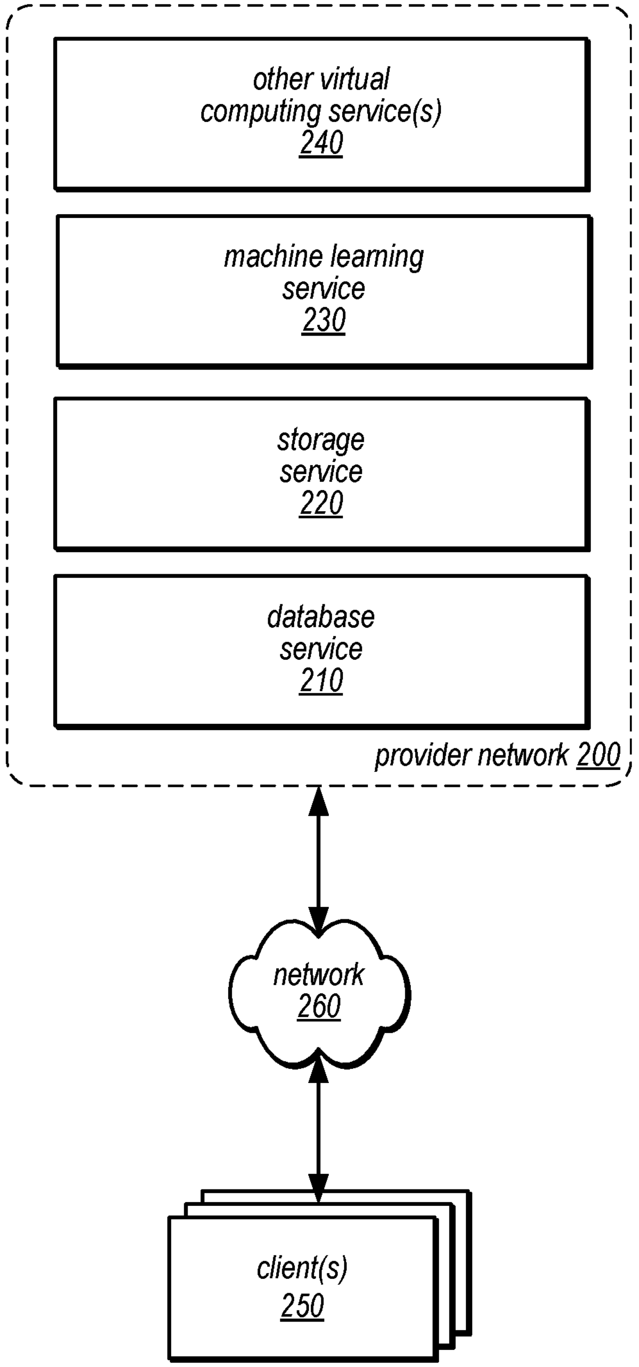
FIG. 2 is a logical block diagram illustrating a provider network that offers a database service and machine learning service that implement querying databases with machine learning model references, according to some embodiments.

FIG. 2 is a logical block diagram illustrating a provider network that offers a database service and machine learning service that implement querying databases with machine learning model references, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network within the provider network 200.

A number of clients (shown as clients 250 may interact with a provider network 200 via a network 260, in some embodiments. Provider network 200 may implement database service 210, storage service 220, machine learning service 230, and/or one or more other virtual computing services 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client that can submit network-based services requests to provider network 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment. Although client(s) 250 are illustrated as external to provider network 200, in some embodiments, internal clients, such as applications or systems implemented on other virtual computing resources may make use of a database hosted by database service 210 by accessing the database using a dynamic proxy implemented as part of proxy service 230.

Clients 250 may convey network-based services requests to and receive responses from provider network 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network 200 using a private network rather than the public Internet. For example, clients 250 may be provisioned within the same enterprise as a database service system (e.g., as part of another network-based service in provider network 200 which also offers database service 210 and/or storage service 220). In such a case, clients 250 may communicate with platform 200 entirely through a virtual private network 260 (e.g., a LAN or WAN that may use Internet-based communication protocols but which is not publicly accessible).

Generally speaking, provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

Provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220, proxy service 230 and/or another virtual computing service 240 (or the underlying systems that implement those services).

In some embodiments, database service 210, storage service 220, machine learning service 230, and/or other virtual computing service(s) 240 may implement user authentication and access control procedures. For example, for a given network-based services request to access a particular database table, a database engine host may ascertain whether the client 250 associated with the request is authorized to access the particular database table. Database service 210 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the proxy node may reject the corresponding network-based services request, for example by returning a response to the requesting client 250 indicating an error condition. Various access control policies may be stored as records or lists of access control information by database service 210, storage service 220, machine learning service 230, and/or other virtual computing services 240.

Note that in some of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network 200 to provide storage of database tables or other information for applications other than those that rely on database service 210 for database management. In such embodiments, clients of the storage service 220 may access storage service 220 via network 260 (e.g., over the Internet). In some embodiments, a virtual computing service, such as machine learning service 230 may receive or use data from storage service 220 (e.g., through an API directly between the virtual computing service and storage service 220) to store objects used in performing computing services on behalf of a client 250. In some cases, the accounting and/or credentialing services of provider network 200 may be unnecessary for internal clients such as administrative clients or between service components within the same enterprise.

Figure 3:
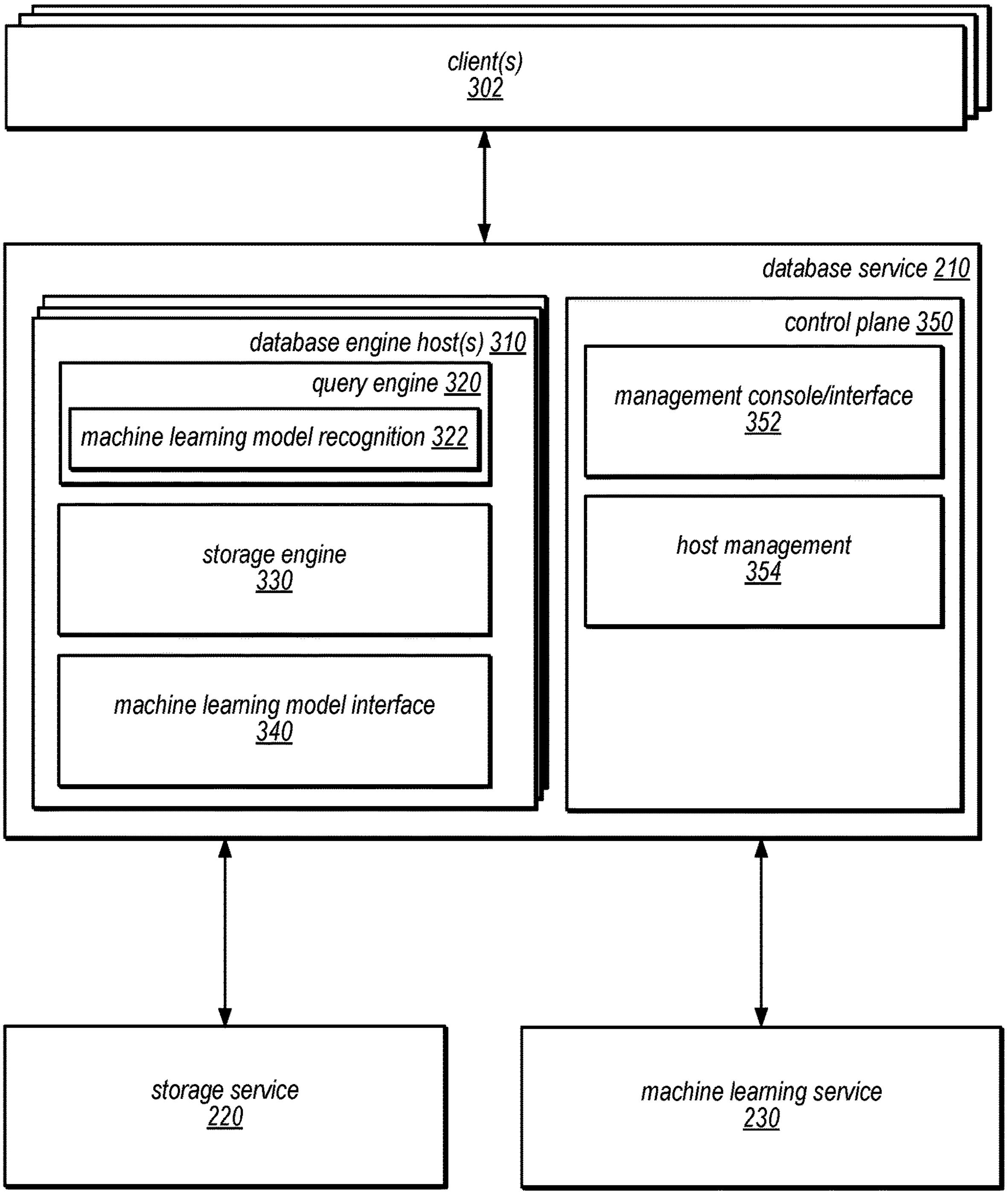
FIG. 3 is a logical block diagram illustrating a database service, according to some embodiments.

FIG. 3 is a logical block diagram illustrating a database service, according to some embodiments. Database service 210 may implement one or more database engine host(s) 310, which may provide access to database data stored in storage service 220, in some embodiments. Client(s) 302 which may be similar to clients 250 in FIG. 2 above or other clients internal to provider network 200 (such as client applications implemented as part of other provider network services 240) may establish connections or otherwise communicate with database engine hosts (e.g., by sending requests to a network address or endpoint associated with a database or database engine host(s) 310 provisioned for a database), in some embodiments.

Database engine host(s) 310 may implement query engine 320 to perform and execute database queries directed to a database, in various embodiments. For example, query engine 320 may implement various query parsing, planning, and other features to determine what operations to perform in order to carry out and respond to a database query received from a client 302. In at least some embodiments, query engine 320 may implement machine learning model recognition 322, which may be implemented as part of query planning and instruction generation. For example, as discussed below with regard to FIG. 10, a query plan to perform a query may be generated that includes one or more operations that cause evaluations of a machine learning model, in order to implement the evaluations into the generation of a query result according to the query plan, in some embodiments. Query engine 320 may implement various cost modeling features in order to select different query operations in order to determine a most cost efficient plan, in some embodiments.

Such cost estimation techniques may also be applied to the selection of different types of machine learning evaluations or operations. For example, in some embodiments, different ways of interacting with a machine learning model, such as requesting evaluations to determine single data values or batch evaluations to determine multiple data values may be weighed. In some embodiments, the cost of evaluating different machine learning models may be compared (e.g., model A is 90% accurate with a low cost and model B is 97% accurate with a high cost so that model A may be selected for low latency queries, such as OLTP style transactions, whereas model B may be selected for complex, long running queries, where performance cost is not as important as accurate analysis), in some embodiments. In some embodiments, evaluations of machine learning model (s) may be performed in order to generate the query plan. For example, an evaluation of a machine learning model may be performed to estimate the size or cardinality of results from individual tables in order to determine an order of join operations that are performed in a database query. Similarly, other query plan operations, such as scan predicates, filter predicates, or aggregation predicates may be influenced or selected by the results of a machine learning model, in some embodiments.

Query engine 320 may execute generated query plans to perform database queries, in various embodiments. Different query operations may involve instruction storage engine 330 to obtain various data from one or more tables in a database, for example, in some embodiments. Other query operations may involve utilizing machine learning model interface 340 to instruct machine learning model evaluations, in some embodiments, as discussed below with regard to FIG. 6.

Database service 350 may also implement control plane 350, in various embodiments. Control plane 350 may provide, for instance an interface or management console 352 which may allow users to separately control or manage database engine hosts (e.g., outside of an application client connected to the database engine hosts). For example, requests to generated, build, train, or retrain a machine learning model may be invoked by one or more interface elements in management console 352, in some embodiments (as opposed to a client application triggering the operation along with performing database queries). Database service control plane 350 may also implement host management 354 to perform various host management operations, including health checks and monitoring, host repair, provisioning and decommissioning hosts for database engines, updating or deploying different software to database engine hosts, among others.

In some embodiments, a storage device may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. A storage device is not necessarily mapped directly to hardware. For example, a single storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages), in some embodiments. In some embodiments, storage pages may be pre-allocated to each segment so that forward processing may not need to wait for allocation. Any changes to the allocation map may need to be made durable before newly allocated storage pages are used by the segments, in some embodiments.

Figure 4:
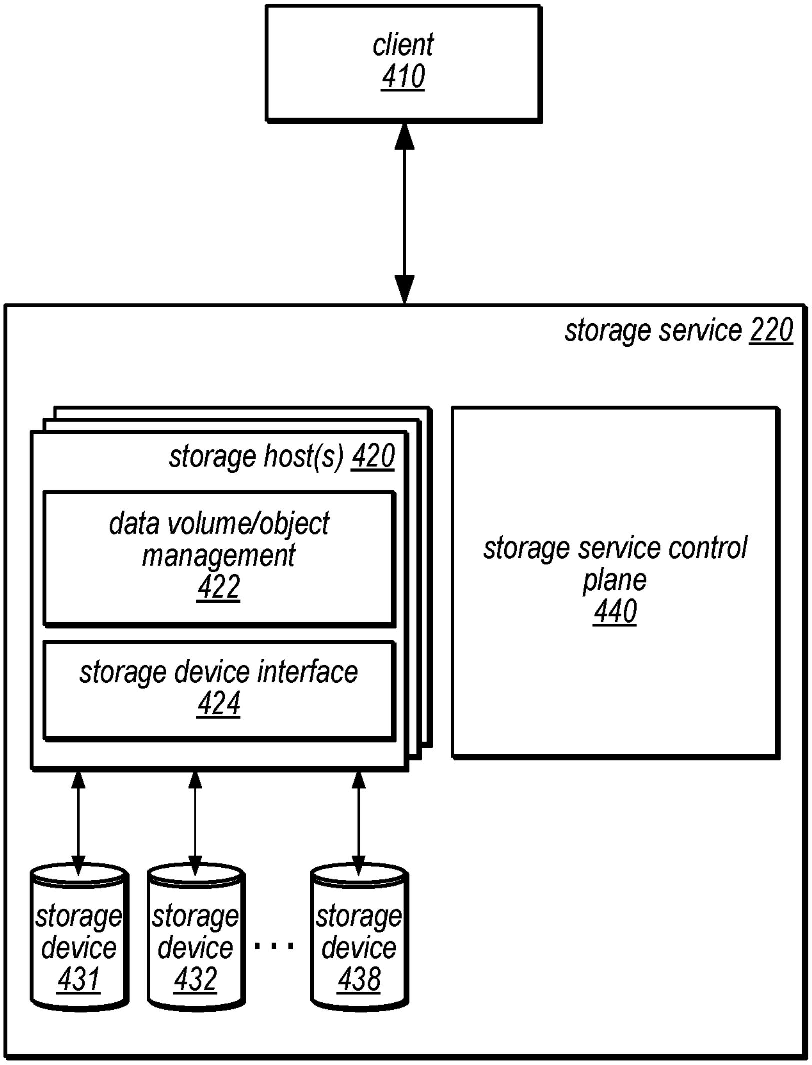
FIG. 4 is a logical block diagram illustrating a storage service, according to some embodiments.

FIG. 4 is a logical block diagram illustrating a storage service, according to some embodiments. Client 410 (which may be a database engine as discussed in FIG. 3 or other client, such as machine learning model host discussed in FIG. 5 or other service component) may be able to access a data volume or object via one or more storage host(s) 420 implemented as part of storage service 420. For example, storage hosts 420 may implement a file system or other storage scheme that allows a client to establish a connection to a volume or other object hosted by storage hosts 420 in order to access that volume or object (e.g., read or write database records, read or copy a machine learning model, etc.). In some embodiments, the file system may be log-based in order to record changes to a data volume or object as log records, whereas in other embodiments, other storage schemas, such as versioning file system, may be implemented.

Storage host(s) 420 may implement data volume/object management 422 in order to perform various operations to respond to access requests from client 410. For example, data volume/object management 422 may interpret access requests for particular data pages or blocks of data volume and generate the appropriate instructions to obtain the data pages or blocks via storage device interface from one or more of storage devices 431, 432 through 438. Data volume/object management 420 may also perform other operations such as replication (locally, e.g., within the storage host or to other storage hosts in a replication group, protection group, or mirrored copy), combine, modify or otherwise update data (either system or user data), such as coalescing log records to generate data pages in a log-structured file system, crash recovery, and/or space management (e.g., for a volume or object). Each storage host 420 may have one or multiple attached storage devices (e.g., SSDs) on which data may be stored on behalf of clients (e.g., users, client applications, and/or database service subscribers), in some embodiments.

Storage service 220 may implement storage service control plane 440 to perform various service management operations, in some embodiments. In at least some embodiments, storage service control plane 440 may implement volume management which may be implemented to create volumes for new databases, facilitate opening and closing of database volumes by clients, and/or recovery operations, in some embodiments.

Please note that while the storage service 220 is described as separate from database service 210, in some embodiments, the functions of a database engine host and storage host may be combined on a single host (e.g., a database system host), and therefore the previous examples are not intended to be limiting. For example, a database service could implement a data warehouse service that partitions a database across multiple nodes (e.g., separate hosts) that both store data for the database in attached storage and perform the various techniques to perform a query as discussed above and below.

Figure 5:
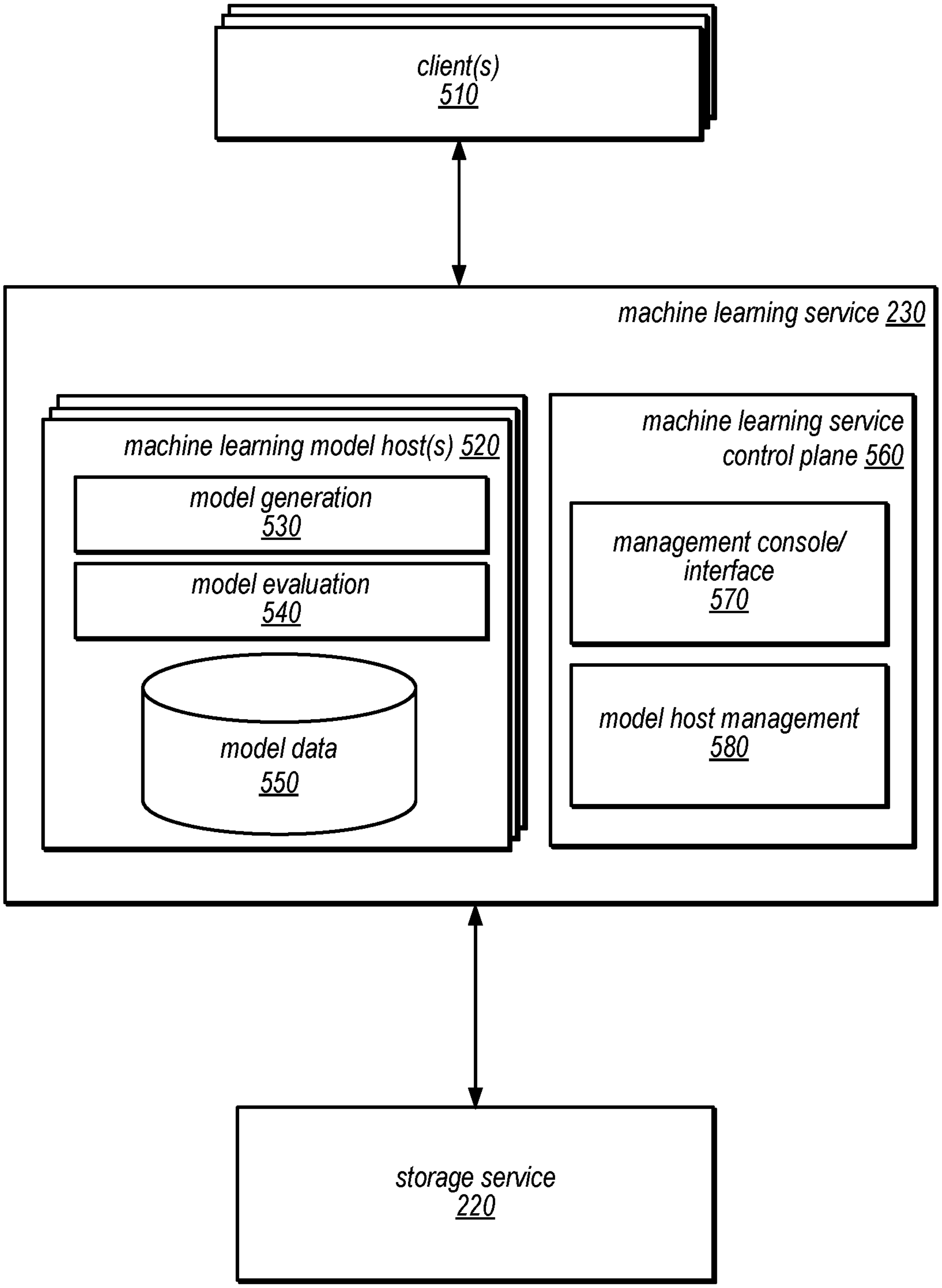
FIG. 5 is a logical block diagram illustrating a machine learning service, according to some embodiments.

FIG. 5 is a logical block diagram illustrating a machine learning service, according to some embodiments. Client(s) 510 may be database engine hosts, as illustrated below in FIGS. 6 and 7, or other applications or services within provider network 200 or external (e.g., clients 250 in FIG. 2), in some embodiments. Client(s) 510 may access a machine learning model hosted at one (or multiple) machine learning model host(s) 520 (e.g., which operate as a cluster to generate, train, build, regenerate, retrain, rebuild, or otherwise evaluate a machine learning model), in some embodiments.

Machine learning model host(s) 520 may implement specialized hardware or computing resources, in some embodiments, in order to perform one or more machine learning techniques. For example, dedicated circuitry devices, such as Application Specific Integrated Circuits (ASICS) or Field Programmable Gate Arrays (FPGAs) may be implemented to perform machine learning techniques or calculations on data in hardware bypassing or limiting use of other general purpose hardware (e.g., CPUs). In another example, machine learning model host(s) 520 may implement various graphical processing units (GPUs) to perform machine learning techniques or operations, such as training for deep learning models, in some embodiments.

Machine learning model host(s) 520 may implement model generation 530 which may apply one or more machine learning techniques selected for the generation, upkeep, or evaluation of a machine learning model, in some embodiments. For example, neural network-based learning methods, k-means clustering, principal component analysis, linear regression, linear classification, or factorization machines, are some of the many different machine learning techniques that may be deployed in response to requests to generate, update, or evaluate a machine learning model. Similarly, machine learning model host(s) may implement model evaluation 540 in order to respond to requests for linear or logistic regression or linear or logistic classification, to perform evaluates to generate classifications or predict event occurrences according to time series information. Unsupervised learning may be utilized by model evaluation 540 to perform other classification evaluations, for example, utilizing k-means clustering and/or principal component analysis (PCA), in some embodiments. Model data 550 may store a generated model (e.g., a classification function, a deep neural network, or other modeling information) either in locally attached storage devices or in a remote data store, such as a volume or object in storage service 220, in some embodiments.

Machine learning service control plane 560 may be implemented to perform various management functions for machine learning model host(s) 520. For example, machine learning service control plane may implement a management console/interface 570 that may allow users (or client applications) to initiate the creation, upgrade, deletion, or evaluation of machine learning model generated and/or stored by machine learning service 230. In some embodiments, model host management 580 may be implemented to perform various host management operations, including health checks and monitoring, host repair, provisioning and decommissioning hosts for machine learning models, updating or deploying different software to machine learning model hosts, among others.

Figure 6:
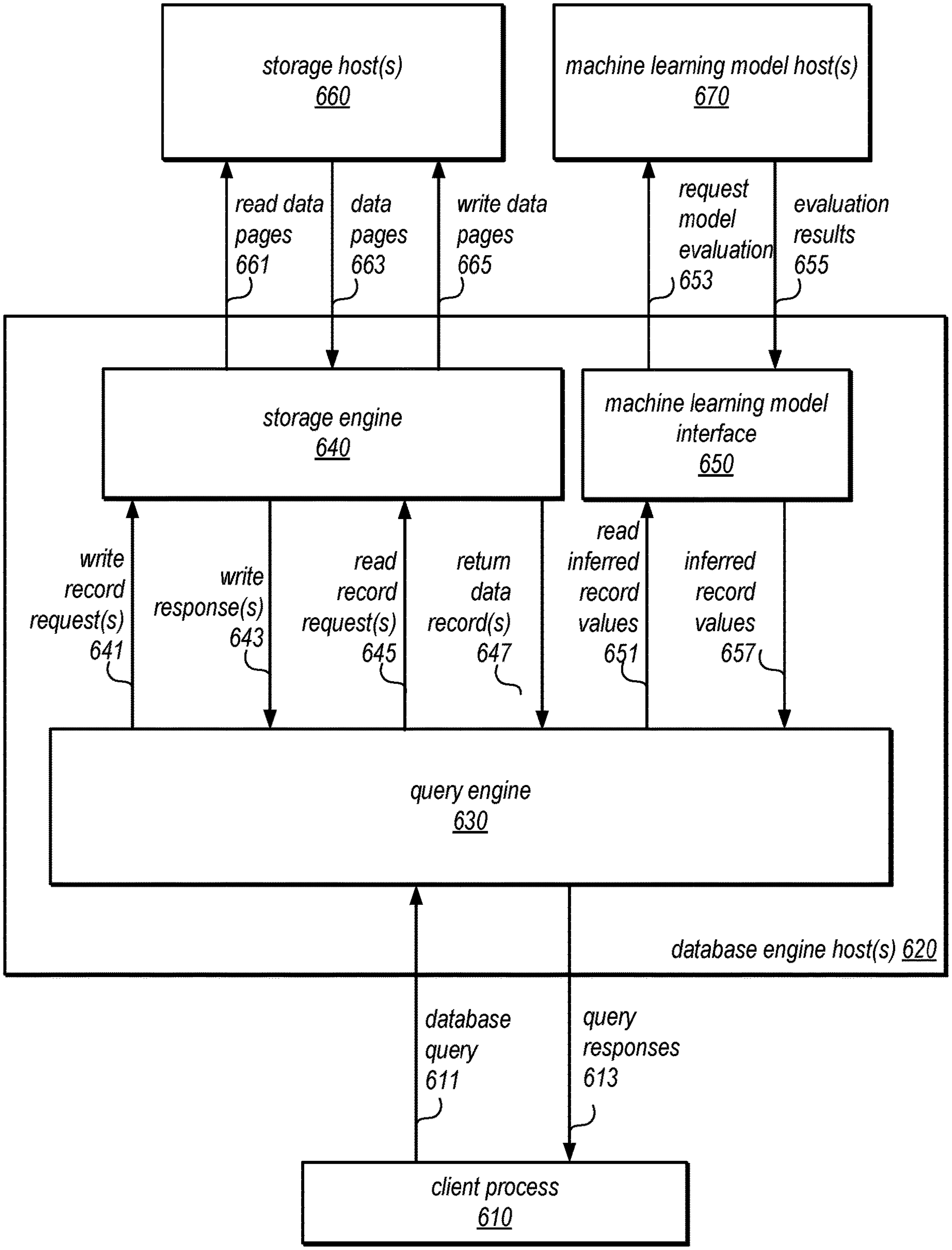
FIG. 6 is a logical block diagram illustrating example client interactions to evaluate a machine learning model referenced in a database query, according to some embodiments

FIG. 6 is a logical block diagram illustrating example client interactions to evaluate a machine learning model referenced in a database query, according to some embodiments. Client process 610 may send a database query 611 that includes a machine learning model reference to query engine 630 at query host(s) 620. Query engine 630 may perform various actions to perform the query. For example, query engine 630 may perform operations to write to database records, write record request(s) 641), and receive write responses 643 to storage engine 640. In some embodiments, storage engine 640 may perform writes to data pages 665 at storage host(s) 660 in order to carry out the write record request(s) 641. Similarly, to read data records as part of performing a query, query engine 630 may perform read record requests 645 to storage engine 640, which in turn may perform read data pages 661 requests to storage hosts 660. Storage hosts 660 may then return data pages 663 to storage engine 640 which may return the desired records 647 to query engine 630.

Query engine 630 may also perform operations to request evaluations (e.g., inferences) by sending read inferred record value requests 651 to machine learning model interface 650 which may send model evaluation requests 653 to machine learning model host(s) 670. Machine learning model host(s) 670 may perform the requested evaluation of the identified model and return the evaluation results 655 via machine learning model interface 650, which may in turn provide the inferred record values 657 to query engine 630. Based on the interactions with storage engine 640 and machine learning model interface 650, query engine 630 may return query responses 613 to client process 610.

In some embodiments, the APIs 661-665 of storage service 220 and the APIs 641-647 of storage engine 640 may expose the functionality of the storage service 220 to query engine 630 as if query engine 630 were a client of storage service 220. Similarly, the APIs 651 and 657 of machine learning model interface 650 and 653 and 655 of machine learning service 230 may expose the functionality of the machine learning service 230 to query engine 630 as if query engine 630 were a client of machine learning service 230.

Note that in various embodiments, the API calls and responses between database engine host(s) 620 and storage service 220/machine learning service 230 and/or the API calls and responses between storage engine 640/machine learning model interface 650 and query engine 630 in FIG. 6 may be performed over a secure connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine host(s) 620 and/or storage service 220.

Figure 7:
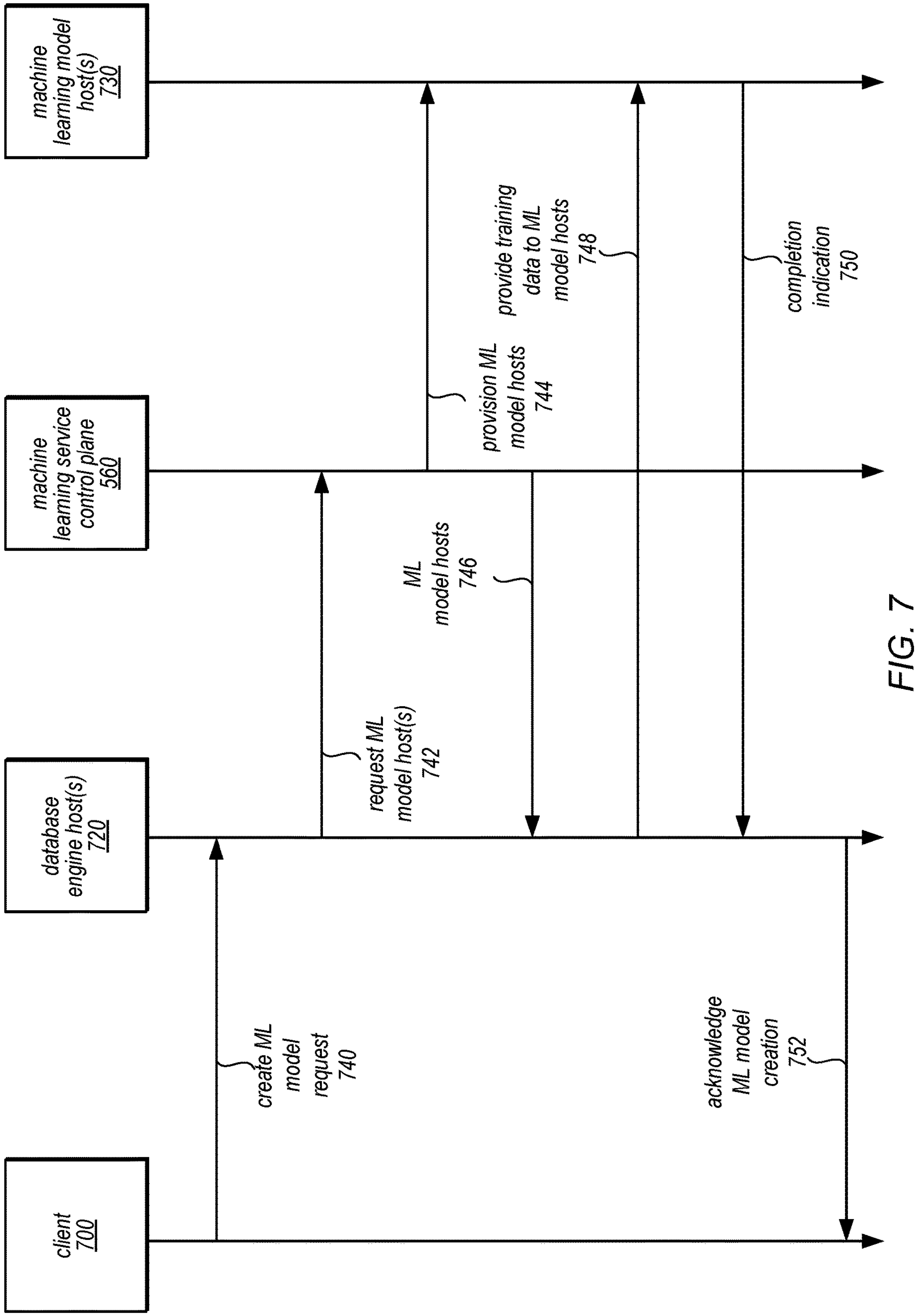
FIG. 7 is a logical block diagram illustrating example client interactions to generate a machine learning model from a database query, according to some embodiments.

FIG. 7 is a logical block diagram illustrating example client interactions to generate a machine learning model from a database query, according to some embodiments. Client 700 may send a request 740 to create, train, or otherwise update a machine learning model to database engine host(s) 720. The request 740 may specify data stored as part of a database accessed by database engine host(s) 720 to use to create, train, or update the machine learning model (e.g., by specifying a SQL statement or partial SQL statement, like a "SELECT FROM WHERE" statement). Database engine host(s) 720 can interpret the request to create, train, or otherwise update, and send a request to machine learning service control plane 560 to obtain or identify machine learning model host(s) 742 for the database to be created (or to be updated), in some embodiments. In those instances where the machine learning model is to be created, machine learning service control plane 560 may provision 744 machine learning model hosts 730 for the creation job (or identify the existing hosts for the model or to be used for the model). In some embodiments, provisioning may include retrieving a previously stored model from storage (e.g., in storage service 220). Machine learning service control plane may then provide an indication 746 of the machine learning model hosts to database engine host(s) 720, in some embodiments.

Database engine host(s) 720 may then provide 748 training data to the machine learning model host(s) 730. For example, database engine host(s) 720 may perform the SQL statement to obtain the results and stream the results to machine learning model host(s) 730 directly, in one embodiment. In other embodiments, database engine host(s) 720 may write the results to a staging area or other storage system (e.g., as a separate object or volume in storage service 220) which may be accessed by machine learning model host(s) 730, in some embodiments. Machine learning model host(s) 730 may provide an indication 750 to database engine host(s) 720 when the model is created (or update completed). In turn database engine hosts 720 may provide an acknowledgement 752 of the machine learning model creation to client 700. In some embodiments, machine learning model creation may be synchronous for database engine host(s) 720, blocking other database requests from being performed during the creation and/or blocking client 700 from performing other requests, whereas in other embodiments, machine learning creation requests may be asynchronous allowing client 700 and/or database engine host(s) 720 to continue performing other work.

The database service, storage service, and machine learning service discussed in FIGS. 2 through 7 provide examples of a system that may implement querying databases with machine learning model references. However, various other types of database systems may implement querying databases with machine learning model references. For example, other kinds of storage systems (e.g., non-log-based data stores or data stores that are not distributed) may provide backend storage or storage may be locally attached. In some embodiments, machine learning capabilities may not be separately implemented but hosted together with a database engine at a some host (e.g., at a same computing node). FIG. 8 is high-level flowchart illustrating various methods and techniques to implement querying databases with machine learning model references, according to some embodiments. Various different systems and devices may implement the various methods and techniques described below, either singly or working together. For example, a database engine host and/or machine learning model host as discussed above may implement the various methods. Alternatively, a combination of different systems and devices may implement the various methods. Therefore, the above examples and or any other systems or devices referenced as performing the illustrated method, are not intended to be limiting as to other different components, modules, systems, or configurations of systems and devices.

As indicated at 810, a database query including a reference to a database and to machine learning model(s) may be received, in some embodiments. The request may be received from a client of a database at a database engine, in some embodiments. The query may be formatted in different ways along with the references. For example, the database query may state "SELECT ML_MODEL_INFERENCE ('model_A', using column1, column2, . . . columnN) FROM table-A WHERE column 2='true'". Please note that other references to machine learning models could be implemented and thus the previous example is not intended to be limiting.

As indicated at 820, the machine learning model(s) may be caused to provide information in response to the query, in some embodiments. For example, the machine learning model reference may specify input parameters (e.g., to be obtained from the query or from the database) that are used to perform the evaluation (e.g., values to generate a feature vector to perform k-means clustering), in some embodiments. These input parameters may be included as part of a request to a separately hosted machine learning model that can apply the learning technique that generated the model in order to evaluate the input parameters, in some embodiments. For example, if a linear regression model is generated to classify whether a transaction specified by the input parameters is fraudulent or legitimate, then the input parameters may include those other column values from a transaction record (e.g., obtained from the query or from the database) to evaluate in light of the model to indicate whether the transaction is fraudulent or legitimate. In some embodiments, the inferred or determined values may be used to determine or may be included in a result of the query.

Figure 9:
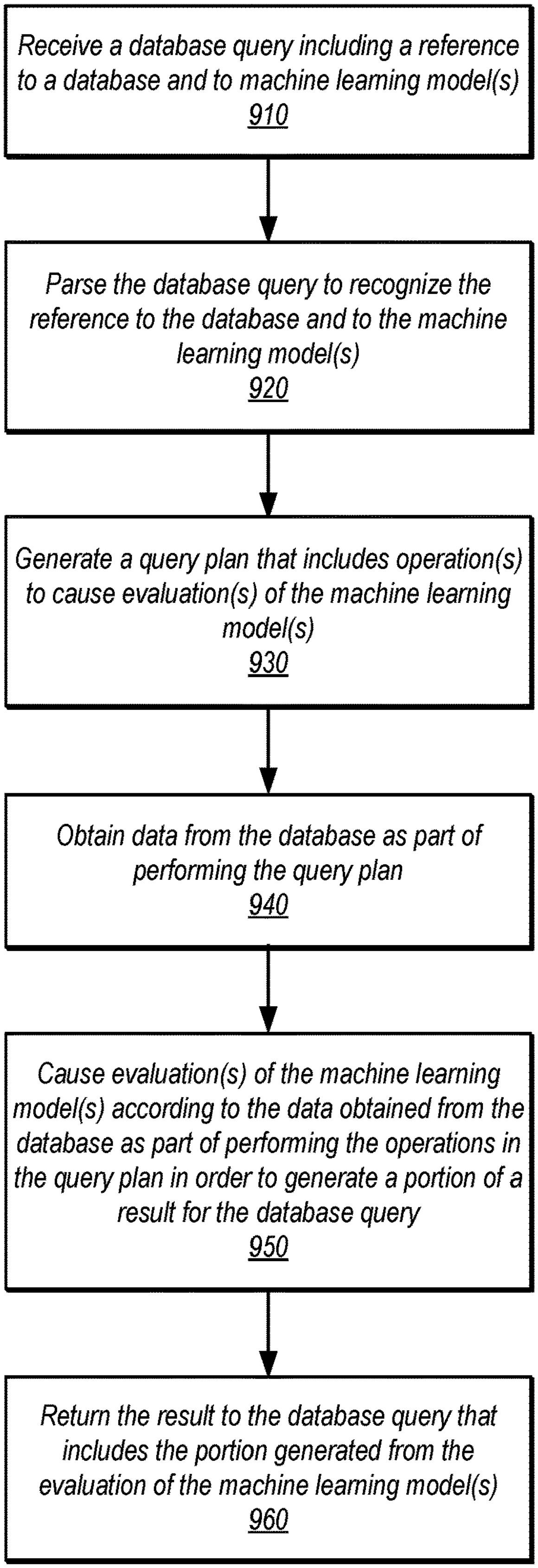
FIG. 9 is high-level flowchart illustrating various methods and techniques to generate a query plan that includes an operation to evaluate a machine learning model referenced in a database query, according to some embodiments.

FIG. 9 is high-level flowchart illustrating various methods and techniques to generate a query plan that includes an operation to evaluate a machine learning model referenced in a database query, according to some embodiments. As indicated at 910, a database query including a reference to a database and to machine learning model(s) may be received, in some embodiments. As discussed above with regard to FIG. 8, the database query may be represented as query language statement or may be implemented as an API request to the database (e.g., a scan API that specifies predicates as "filters" and an item to return that references the machine learning model as the desired data value to return) or as a protocol request (e.g., an HTTP GET request).

As indicated at 920, the database query may be parsed to recognize the reference to the database and to the machine learning model(s), in various embodiments. For example, a keyword, offset, or other information indicating the location of the reference within the database query may be maintained, in some embodiments (e.g., a parameter number), and compared with a parsed result of a database query (e.g., where parameter 3 is the machine learning model reference) or an evaluation of a database data dictionary or other schema information for a parameter or predicate indicates that the parameter or predicate is not found in the schema).

As indicated at 930, a query plan may be generated that includes operation(s) to cause evaluation(s) of the machine learning model(s), in some embodiments. For example, a query plan may be generated that represents different operations as nodes in a tree or other set of instructions, in some embodiments. One or more nodes in the tree may be machine learning evaluation operations (e.g., instead of database data operations to search the database) for a value which may then be combined with other operations to generate a final query result (e.g., to determine a join key value, filter value, or to fill in a null value in a column). As discussed above with regard to FIG. 3, in some embodiments, different types of machine learning model operations may be selected as part of query plan generation (e.g., batch evaluations or single evaluations, model A evaluations vs. model B evaluations, etc.).

As indicated at 940, data from the database may be obtained as part of performing the query plan, in some embodiments. For example, scan, filter, aggregate, or other operations may be performed to read and/or manipulate data in the database for use in generating a result for the database query (which may in some scenarios apply filters or values generated by an evaluation of a machine learning model, whereas in other scenarios filters or values may be specified in the query itself). As indicated at 950, evaluation(s) of the machine learning model(s) may be caused according to the data obtained from the database as part of performing the operations in the query plan in order to generate a portion of a result for the database query. For example, if a labeling or inferencing technique is performed by evaluating the machine learning model to supply a missing data value for a query result (e.g., fraudulent or legitimate using the example given above), then the other values upon which the labeling or inferencing technique is performed according to the model may be obtained from the database (e.g., by performing a database operation to retrieve the data earlier in the query plan). A query plan may, in various embodiments, be generated in order to determine such dependencies between machine learning evaluations and database operations (e.g., in a manner similar to determine join ordering for partitions of a hash join operation). As indicated at 960, the result of the database query may be returned that includes the portion generated from the evaluation of the machine learning models, in some embodiments. Note that although FIG. 9 illustrates providing the evaluation of machine learning models to be performing using data obtained from a database, in other scenarios the evaluation may be performed without such data and/or may be performed to provide inputs to the performance of operation to obtain data from the database.

Figure 10:
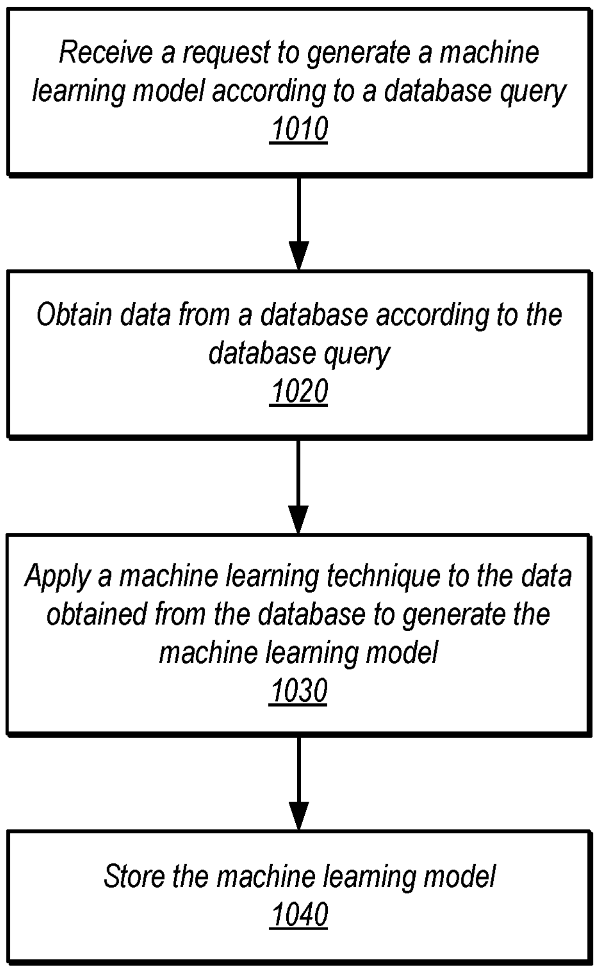
FIG. 10 is high-level flowchart illustrating various methods and techniques to perform a database query to generate a machine learning model, according to some embodiments.

FIG. 10 is high-level flowchart illustrating various methods and techniques to perform a database query to generate a machine learning model, according to some embodiments. As indicated at 1010, a request may be received to generate a machine learning model according to a database query, in some embodiments. For example, an API or other interface command may be interpreted by a database engine (or other database system component) which may recognize the request and/or execute performance of the request. The request may identify what data to obtain, the data source of the data, security credentials, the machine learning technique to generate the model, training parameters, and/or whether or not the creation request is blocking (e.g., asynchronous or synchronous), in some embodiments. For instance, the request may be an API with the following example syntax, "TRAIN_MODEL ('select statement'), USING ('database_name'), IDENTITY ('username, password, role'), ALGORITHM NAME ('linear_regresion'), TRAINING PARAMETERS ('number of passes over data', 'bias settings', etc.), BLOCKING ('yes')".

As indicated at 1020, data may be obtained from a database according to the database query, in some embodiments. For example, a query engine may perform the query to the identified database in order to retrieve the data and may directly provide the results to machine learning analysis host or store the results in a location accessible to the machine learning analysis host, in some embodiments. As indicated at 1030, a machine learning technique indicated the request may be applied to the obtained data to generate the machine learning model, in some embodiments. If, for instance, the database values may be used to train a deep neural network, then the values of the database may be input to a training component for the model. As indicated at 1040, then the machine learning model may be stored, in some embodiments. For example, the machine learning model may be stored in a data store (separate from a model evaluation platform like machine learning model hosts in FIG. 5) or with database data, in some embodiments. The elements described above may be similarly performed to update a machine learning model that is already generated, in some embodiments.

Figure 11:
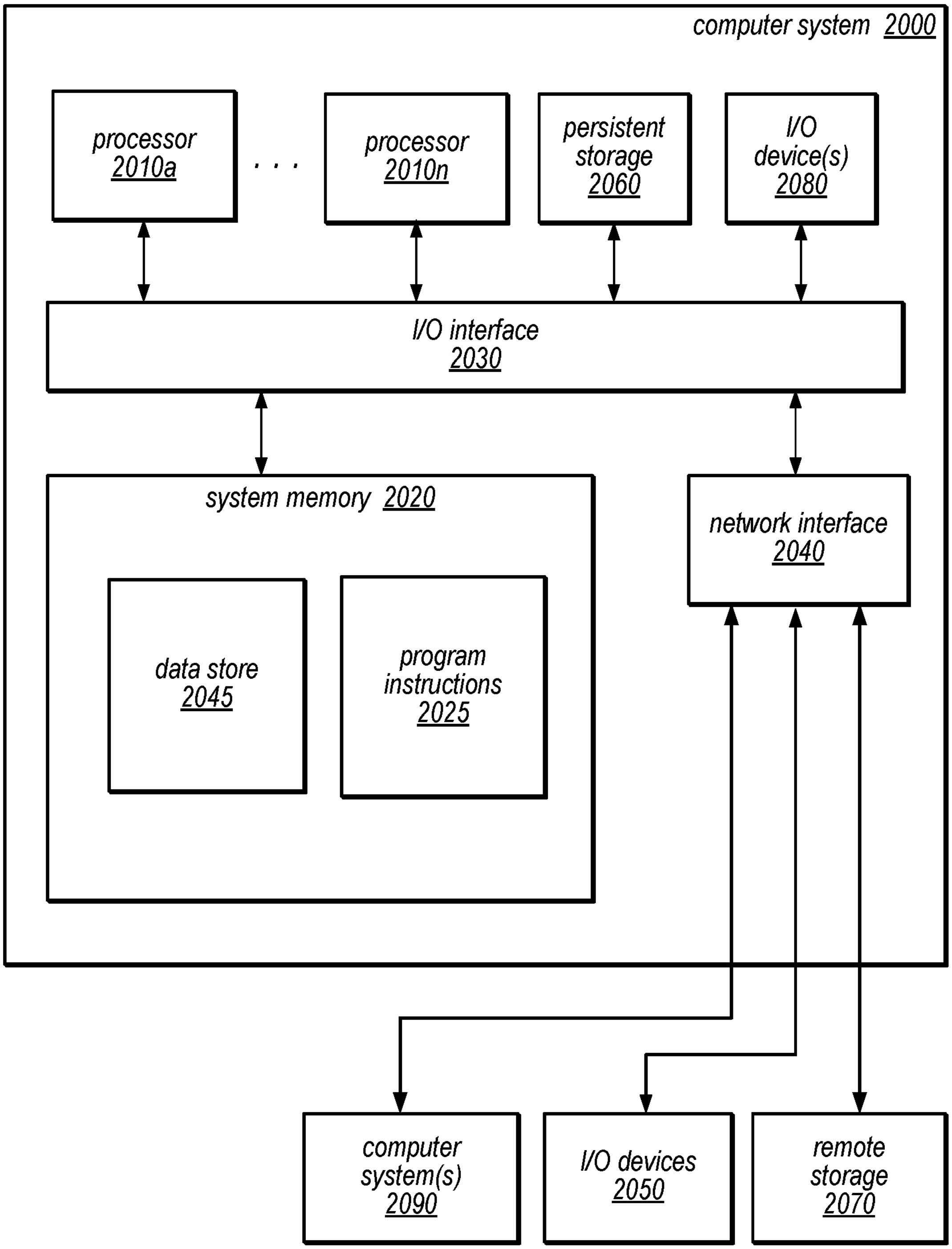
FIG. 11 is a block diagram illustrating an example computer system, according to various embodiments.

FIG. 11 is a block diagram illustrating an example computer system, according to various embodiments. For example, computer system 2000 may implement a database engine host, machine learning model host, and/or a storage host, in various embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, as described herein. For example, the information described herein as being stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

a plurality of computing devices, respectively implement a processor and a memory, configured to implement a provider network service, the provider network service configured to:

receive, via an interface of the provider network service, a query statement that is stated in Structured Query Language (SQL), wherein the interface supports queries stated in the query language, and wherein the query statement specifies a column in a table of a data warehouse and a machine learning model;

cause an evaluation of respective data in the specified column to determine one or more records in the table of the data warehouse to add inferred data values determined from the machine learning model referenced in the query;

cause the evaluation of the machine learning model referenced in the query to determine the inferred data values for the one or more records in the table;

return, via the interface of the provider network service, a result of the query statement based on the inferred data values from the evaluation of the machine learning model determined for the one or more records.

2. The system of claim 1, wherein the provider network service is further configured to:

receive a request, via the interface of the provider network service, to create the machine learning model according to a second query directed to the data warehouse;

responsive to the request to create the machine learning model:

obtain further data from the data warehouse according to the second query; and apply one or more machine learning techniques to the further data obtained from the data warehouse to create the machine learning model.

3. The system of claim 1, wherein the interface of the provider network is a Representational State Transfer (REST) Application Programming Interface (API).

4. The system of claim 1, wherein the data warehouse is stored in column-oriented format.

5. The system of claim 1, wherein the provider network service is further configured to:

receive, via the interface of the provider network service, a request to retrain the machine learning model according to further data obtained from the data warehouse;

responsive to the request to retrain the machine learning model:

obtain the further data from the data warehouse; and apply one or more machine learning techniques to the further data obtained from the data warehouse to retrain the machine learning model.

6. The system of claim 1, wherein the machine learning model is a linear regression model.

7. A method, comprising:

receiving, via an interface of provider network service, a query statement that is stated in Structured Query Language (SQL), wherein the interface supports queries stated in the query language, and wherein the query statement specifies a column in a table of a data warehouse and a machine learning model;

causing, by the provider network service, an evaluation of respective data in the specified column to determine one or more records in the table of the data warehouse to add inferred data values determined from the machine learning model referenced in the query;

causing, by the provider network service, the evaluation of the machine learning model referenced in the query to determine the inferred data values for the one or more records in the table;

returning, via the interface of the provider network service, a result of the query statement based on the inferred data values from the evaluation of the machine learning model determined for the one or more records.

8. The method of claim 7, further comprising:

receiving a request, via the interface of the provider network service, to create the machine learning model according to a second query directed to the data warehouse;

responsive to the request to create the machine learning model:

obtaining further data from the data warehouse according to the second query; and applying one or more machine learning techniques to the further data obtained from the data warehouse to create the machine learning model.

9. The method of claim 7, wherein the interface of the provider network is a Representational State Transfer (REST) Application Programming Interface (API).

10. The method of claim 7, wherein the data warehouse is stored in column-oriented format.

11. The method of claim 7, further comprising:

receiving, via the interface of the provider network service, a request to retrain the machine learning model according to further data obtained from the data warehouse;

responsive to the request to retrain the machine learning model:

obtaining the further data from the data warehouse; and applying one or more machine learning techniques to the further data obtained from the data warehouse to retrain the machine learning model.

12. The method of claim 7, wherein the machine learning model is a linear regression model.

13. The method of claim 7, wherein the machine learning model performs classification.

14. One or more non-transitory, computer-readable storage media, storing program instructions that when executed on or across one or more computing devices, cause the one or more computing devices to implement:

receiving, via an interface of provider network service, a query statement that is stated in Structured Query Language (SQL), wherein the interface supports queries stated in the query language, and wherein the query statement specifies a column in a table of a data warehouse and a machine learning model;

causing, by the provider network service, an evaluation of respective data in the specified column to determine one or more records in the table of the data warehouse to add inferred data values determined from the machine learning model referenced in the query;

causing, by the provider network service, the evaluation of the machine learning model referenced in the query to determine the inferred data values for the one or more records in the table;

returning, via the interface of the provider network service, a result of the query statement based on the inferred data values from the evaluation of the machine learning model determined for the one or more records.

15. The one or more non-transitory, computer-readable storage media of claim 14, storing further program instructions that when executed on or across the one or more computing devices, cause the one or more computing devices to further implement:

receiving a request, via the interface of the provider network service, to create the machine learning model according to a second query directed to the data warehouse;

responsive to the request to create the machine learning model:

obtaining further data from the data warehouse according to the second query; and applying one or more machine learning techniques to the further data obtained from the data warehouse to create the machine learning model.

16. The one or more non-transitory, computer-readable storage media of claim 14, wherein the interface of the provider network is a Representational State Transfer (REST) Application Programming Interface (API).

17. The one or more non-transitory, computer-readable storage media of claim 14, wherein the data warehouse is stored in column-oriented format.

18. The one or more non-transitory, computer-readable storage media of claim 14, storing further program instructions that when executed on or across the one or more computing devices, cause the one or more computing devices to further implement:

receiving, via the interface of the provider network service, a request to retrain the machine learning model according to further data obtained from the data warehouse;

responsive to the request to retrain the machine learning model:

obtaining the further data from the data warehouse; and applying one or more machine learning techniques to the further data obtained from the data warehouse to retrain the machine learning model.

19. The one or more non-transitory, computer-readable storage media of claim 14, wherein the machine learning model is a linear regression model.

20. The one or more non-transitory, computer-readable storage media of claim 14, wherein the machine learning model performs classification.

* * * * *